(12) United States Patent
Podszun et al.

(10) Patent No.: US 6,294,623 B1
(45) Date of Patent: Sep. 25, 2001

(54) PRODUCTION OF SPHERICAL POLYMERS

(75) Inventors: Wolfgang Podszun, Köln; David Byran Harrison, Leverkusen, both of (DE); Frank Louwet, Diepeneek (BE)

(73) Assignee: Agfa-Gevaert (BE)

( * ) Notice: Subject to any disclaimer, the term of this patent is extended or adjusted under 35 U.S.C. 154(b) by 0 days.

(21) Appl. No.: 09/459,297

(22) Filed: Dec. 10, 1999

Related U.S. Application Data

(63) Continuation-in-part of application No. 09/392,808, filed on Sep. 9, 1999, now abandoned.

(30) Foreign Application Priority Data

Sep. 15, 1998 (DE) .............................................. 198 42 055

(51) Int. Cl.$^7$ ...................................................... C08F 2/38
(52) U.S. Cl. ................... 526/82; 526/83; 526/84; 526/209; 526/212; 526/245; 526/279; 526/329.2; 526/329.7; 526/346

(58) Field of Search .................................. 526/82, 83, 84, 526/209, 220, 909, 212, 329.2, 329.7, 346

(56) References Cited

U.S. PATENT DOCUMENTS

| 4,369,296 | 1/1983 | Podszun et al. | ...................... 526/209 |
| 5,567,785 | 10/1996 | Decker et al. | ........................ 526/212 |

FOREIGN PATENT DOCUMENTS

| 0 036 969 | 10/1981 | (EP) . |
| 959356 | 6/1964 | (GB) . |
| 91/06280 | 5/1991 | (WO) . |

*Primary Examiner*—Fred Teskin
(74) *Attorney, Agent, or Firm*—Connolly Bove Lodge & Hutz LLP

(57) ABSTRACT

The process for producing bead polymers having a mean particle size of 0.5 to 50 $\mu$m and a narrow particle size distribution by polymerisation of monomers dissolved in a solvent that constitutes a precipitation agent for the polymers obtained from these monomers is characterized in that the solvent contains 5 to 3000 ppm of sulfur-free radical interceptors.

17 Claims, No Drawings

PRODUCTION OF SPHERICAL POLYMERS

This application is a continuation in part of Ser. No. 09/392,808 which was filed Sep. 9, 1999, now abandoned and claims priority to German application number 19842055.2 filed Sep. 15, 1998 which are both incorporated by reference in its entirety for all useful purposes.

The present invention relates to the production of spherical polymers having a mean particle size of 0.5 to 50 um and narrow particle size distribution.

Spherical polymers having a mean particle size of 0.5 to 50 um are widely used, for example as spacers for film materials, as catalyst supports, as calibrating substances for light scattering measurements, or as starting materials for chromatography resins and ion exchangers. For many applications polymers are desired having as uniform a particle size as possible.

So-called dispersion polymerization is generally used to produce polymers having mean particle sizes of 0.5 to ca. 10 um. In this process a solvent is used that dissolves the monomer but not the polymer that is formed. During the polymerization the polymer formed precipitates out in the form of small spheres. Suitable solvents are primarily alcohols, mixtures of various alcohols, and mixtures of alcohol and water. A characteristic feature of this process is that the reaction becomes less reproducible with increasing particle size and the particle size distribution becomes significantly broader.

A. J. Paine et al. describe in their work, "Dispersion Polymerization of Styrene in Polar Solvents", Macromolecules 1990, 23, 3104–3109, that when using butyl mercaptan as chain transfer agent, polydisperse particles are obtained. A similar effect is found in EP 584 407 in the dispersion polymerization of methyl methacrylate using lauryl mercaptan as molecular weight regulator. In both these literature references the influence of the molecular weight regulator on the particle size is slight.

It has now surprisingly been found that by adding sulfur-free radical interceptors in the dispersion polymerization, the mean particle size is displaced to considerably higher values. In this way monodisperse bead polymers can be obtained in a size range that is not possible using the methods of the prior art. Furthermore, in many cases a narrower particle size distribution is achieved.

The present invention provides a process for producing bead polymers having a mean particle size of 0.5 to 50 um and a narrow particle size distribution by dispersion polymerization of at least one monomer in a solvent, characterized in that the solvent contains 5 to 3000 ppm of sulfur-free radical interceptors. A narrow particle size distribution $\phi 90/\phi 10$ value is at most about 2 $\mu$m, preferably at most about 1.6 $\mu$m.

The process according to the invention is preferably carried out using an initiator, in the presence of a high molecular weight dispersant.

Suitable monomers for the process are monoethylenically unsaturated compounds such as styrene, alpha-methyl styrene, chlorostyrene, (meth)acrylic acid esters, for example (meth)acrylic acid esters containing perfluoroalkyl groups. Styrene and methyl methacrylate are preferred. In order to achieve crosslinking small amounts of silane monomers may also be used according to EP-A-417 539.

The solvent comprises mainly non-aqueous solvents such as dioxane, acetone, acetonitrile, dimethyl formamide and alcohols. Lower alcohols are preferred, in particular methanol, ethanol, n-propanol, iso-propanol, n-butanol, iso-butanol and tert.-butanol. Mixtures of various solvents, in particular mixtures of different alcohols, are also very suitable. The alcohols may also contain up to 50 wt. % of water, preferably up to 25 wt. % of water. When using solvent mixtures, non-polar solvents may also be used, in particular hydrocarbons such as hexane and heptane, in amounts of up to 50 wt. %.

The ratio of monomer to solvent is 1:1 to 1:20, preferably 1:3 to 1:10.

Soluble natural and synthetic macromolecular compounds are suitable as high molecular weight dispersants in the solvent that is employed. Examples include cellulose derivatives such as methyl cellulose, ethyl cellulose, hydroxypropyl cellulose, polyvinyl acetate, partially saponified polyvinyl acetate, polyvinyl pyrrolidone, copolymers of vinyl pyrrolidone and vinyl acetate, as well as copolymers of styrene and maleic anhydride. Polyvinyl pyrrolidone is preferred. The amount of high molecular weight dispersant is 0.1 to 20 wt. %, preferably 0.2 to 10 wt. %, referred to the solvent.

In addition to the dispersants, ionic and non-ionic surfactants may also be used. Suitable surfactants are for example sodium sulfosuccinate, methyltricaprylammonium chloride or ethoxylated nonyl phenol. The surfactants may be used in amounts of 0.1 to 2 wt. % referred to the solvent.

Suitable initiators for the process according to the invention include compounds that form free radicals on raising the temperature. Examples of such initiators are: peroxy compounds such as dibenzoyl peroxide, dilauryl peroxide, bis (p-chlorobenzoyl peroxide), dicyclohexylperoxy dicarbonate and tert.-amylperoxy-2-ethylhexane, as well as azo compounds such as 2,2'-azobis(isobutyronitrile) and 2,2'-azobis(2-methylisobutyronitrile). If the polar medium contains water, then sodium peroxy-disulfate is also suitable.

Aliphatic peroxy esters corresponding to formulae I, II or III are also highly suitable:

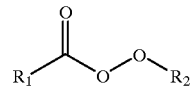

Formula I

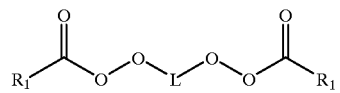

Formula II

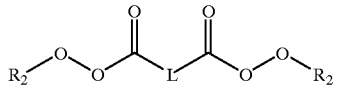

Formula III wherein
 $R_1$ denotes an alkyl radical or a cycloalkyl radical with 2 to 20 C atoms,
 $R_2$ denotes a branched alkyl radical with 4 to 12 C atoms, and
 L denotes an alkylene radical or cycloalkylene radical with 2 to 20 C atoms.

Examples of aliphatic peroxy esters according to formula I are:

tert.-butylperoxy acetate
tert.-butylperoxy isobutyrate
tert.-butylperoxy pivalate
tert.-butylperoxy octoate
tert.-butylperoxy-2-ethylhexanonate
tert.-butylperoxy neodecanoate tert.-amylperoxy pivalate
tert.-amylperoxy octoate
tert.-amylperoxy-2-ethylhexanonate
tert.-amylperoxy neodecanoate.

Examples of aliphatic peroxy esters according to formula II are:

2,5-bis(2-ethylhexanoylperoxy)-2,5-dimethylhexane
2,5-dipivaloyl-2,5-dimethylhexane
2,5-bis(2-neodecanoylperoxy)-2,5-dimethylhexane.

Examples of aliphatic peroxy esters according to formula III are:

di-tert.-butylperoy azelate
di-tert.-amylperoy azelate.

The initiators are generally used in amounts of 0.05 to 6.0 wt. %, preferably 0.2 to 4.0 wt. %, referred to the monomer or the monomer mixture.

Radical interceptors in the context of this invention include polymerisation inhibitors as well as molecular weight regulators.

Inorganic as well as organic compounds are suitable as polymerisation inhibitors. Examples of inorganic inhibitors include e.g. nitrogen compounds such as hydroxylmine, hydrazine, sodium nitrite and potassium nitrite. Examples of organic inhibitors include phenolic compounds such as hydroquinone, hydroquinone monomethyl ether, resorcinol, pyrocatechol, tert.-butylpyrocatechol, and condensation products of phenols and aldehydes. Further suitable organic inhibitors are nitrogen-containing compounds such as diethylhydroxylamine and isopropylhydroxylamine.

Suitable molecular weight regulators are the sulfur-free regulators disclosed in for example DE 3 010 373, for example the enol ether according to formula IV.

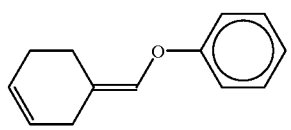

Formula IV

The concentration of the radical interceptor is preferably 10–1500 ppm referred to the solvent. Inhibitors are particularly preferably used in amounts of 10–500 ppm, and molecular weight regulators preferably in amounts of 100–1500 ppm, in each case referred to the solvent.

The polymerisation temperature is governed by the decomposition temperature of the radical former as well as by the boiling point of the solvent, and is typically in the range from 50° C. to 150° C., preferably 60° to 120° C. The polymerisation is advantageously carried out at the boiling point of the solvent and the reactants are advantageously stirred during the polymerisation. The polymerisation time is generally several hours, for example 2 to 30 hours.

The polymers obtained according to the invention can be isolated from the reaction mixture by filtration or, particular preferably, by sedimentation by means of a centrifuge or a decanter.

The polymers obtained by the process according to the invention may be used for example as spacers for film materials, as catalyst supports, or as starting materials for chromatography resins and ion exchangers. In addition they are outstandingly suitable for producing 3D models by laser sintering (so-called rapid prototyping).

The term rapid prototyping covers the currently known, computer-controlled additive automated model construction processes. Laser sintering denotes a rapid prototyping process in which charges of specific pulverulent materials are heated and sintered at specific spatial points under the action of laser radiation preferably controlled by a program.

EXAMPLES 1–5 and

Comparison Examples 1 and 2

22.5 g of polyvinyl pyrrolidone, 11.25 g of methyltricaprylammonium chloride and the amount of diethylhydroxylamine specified in Table 1 were dissolved in a reaction flask equipped with a reflux condenser, stirrer and thermometer. A mixture of 243.5 g of methyl methacrylate, 6.25 gamma-methacryloxypropyl trimethoxysilane and 2.25 g of t-butyl perpivalate (75%) was added to this solution. The mixture was heated for 10 hours under reflux (ca. 65° C.) while stirring and then cooled to 25° C. 100 ml of 1 N HCl was next added dropwise. The reaction mixture was stirred for a further hour at 25° C., following which the bead polymer was isolated by centrifugation, washed with methanol, and dried at 50° C.

TABLE 1

| Examples | Solvent M: Methanol W: Water (vol-%) | Amount of diethyl hydroxylamine referred to solvent | Ø (50) µm | Ø (10) µm | Ø (90) µm | Ø (90)/ Ø (10) µm |
|---|---|---|---|---|---|---|
| Comparison 1 | M | 0 ppm | 2.75 | 1.30 | 6.13 | 4.72 |
| Comparison 2 | M/W (80/20) | 0 ppm | 1.81 | 1.12 | 3.03 | 2.71 |
| Example 1 | M | 10 ppm | 5.41 | 4.95 | 5.85 | 1.18 |
| Example 2 | M | 20 ppm | 5.45 | 4.95 | 5.94 | 1.20 |
| Example 3 | M/W (80/20) | 50 ppm | 6.37 | 5.47 | 6.66 | 1.22 |
| Example 4 | M | 100 ppm | 7.68 | 6.69 | 10.02 | 1.50 |
| Example 5 | M/W (80/20) | 100 ppm | 7.35 | 6.50 | 9.59 | 1.48 |

Ø (50): 50% value of the volume distribution, i.e. 50 vol. % of particles are less than this value
Ø (10): 10% value of the volume distribution, i.e. 10 vol. % of particles are less than this value
Ø (90): 90% value of the volume distribution, i.e. 90 vol. % of particles are less than this value
Ø (90) Ø (10): Measure of the width of distribution; the smaller the value, the narrower the distribution.

EXAMPLES 6 to 10 and

Comparison Example 3

2340 g of methanol, 300 g of methyl methacrylate, 180 g of polyvinyl pyrrolidone K30 and the enol ether of formula IV in the amount specified in Table 2 were mixed to form a homogenous solution in a 4 l capacity reactor equipped with a gate agitator. The solution was heated to 55° C. within 1 hour under nitrogen at a stirring rate of 100 revs/min and a solution of 9 g of 2,2'-azobis(iso-butyronitrile) in 165 g of methanol was added to the reactor. The polymerisation mixture was stirred for a further 20 hours at 55° C. and 100 revs/min. The prepared polymer dispersion was then cooled to room temperature and the bead polymer was isolated by sedimentation. The particle sizes of the resultant bead polymers are shown in Table 2.

TABLE 2

| Examples | Amount of enol ether (formula IV) referred to methanol | Ø (50) μm | Ø (10) μm | Ø (90) μm | Ø (90)/ Ø (10) μm |
|---|---|---|---|---|---|
| Comparison 3 | 0 ppm | 6.25 | 5.45 | 6.77 | 1.24 |
| Example 6 | 400 ppm | 7.09 | 6.49 | 7.69 | 1.18 |
| Example 7 | 800 ppm | 7.53 | 7.12 | 8.30 | 1.17 |
| Example 8 | 1200 ppm | 11.43 | 10.49 | 12.46 | 1.19 |
| Example 9 | 2000 ppm | 13.57 | 12.25 | 14.33 | 1.17 |
| Example 10 | 2400 ppm | 35.39 | 28.5 | 45.34 | 1.59 |

What is claimed is:

1. A process for producing bead polymers having a mean particle size of 0.5 to 50 μm and a narrow particle size distribution which comprises polymerizing monomers dissolved in a solvent that constitutes a precipitation agent for the polymers obtained from these monomers, wherein the solvent contains 5 to 3000 ppm of a sulfur-free radical interceptor.

2. Process according to claim 1, wherein the radical interceptor is a polymerization inhibitor.

3. Process according to claim 1, wherein the radical interceptor is a molecular weight regulator.

4. Process according to claim 3, wherein the molecular weight regulator is an enol ether.

5. Process according to claim 4, wherein the enol ether has the formula

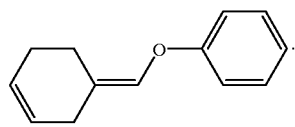

6. The process is claimed in claim 1, wherein said monomers are monoethylenically unsaturated compounds.

7. The process is claimed in claim 6, wherein said monoethylenically unsaturated compounds are styrene, alpha-methyl styrene, chlorostyrene or (meth)acrylic acid esters.

8. The process according to claim 6, wherein the monoethylenically unsaturated compounds are (meth)acrylic acid esters containing perfluoroalkyl groups.

9. The process according to claim 1, wherein said monomers are styrene or methyl methacrylate.

10. The process according to claim 1, wherein said solvent is non-aqueous solvent.

11. The process according to claim 10, wherein said non-aqueous solvent is dioxane, acetone, acetonitrile, dimethyl formamide or alcohol.

12. The process according to claim 1, wherein the ratio of monomer to solvent is 1.1 to 1.20.

13. The according to claim 11, wherein the ratio of monomer to solvent is 1:3 to 1:10.

14. The process according to claim 1, wherein the solvent is a solvent mixture containing non-polar solvents in amounts up to 50% by weight and containing alcohol.

15. The process according to claim 5, wherein the concentration of the enol ether is from 10–1,500 ppm.

16. The process according to claim 2, wherein the inhibitor is present in amount from 10–500 ppm.

17. The process according to claim 3, wherein the molecular weight regulator is used in the amounts 100–1,500 ppm per the solvent.

* * * * *